R. GIPSON.
Grain Winnower.
No. 112,584.
Patented March 14, 1871.
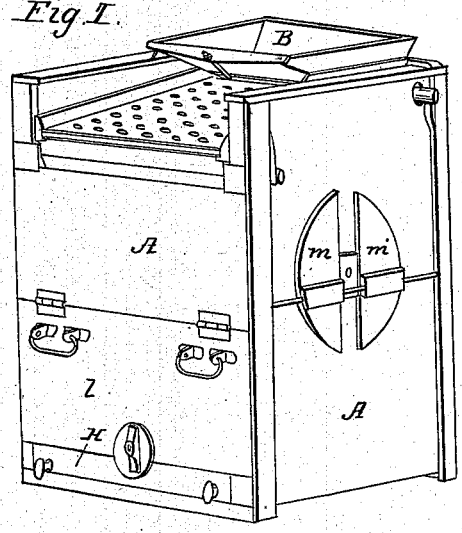
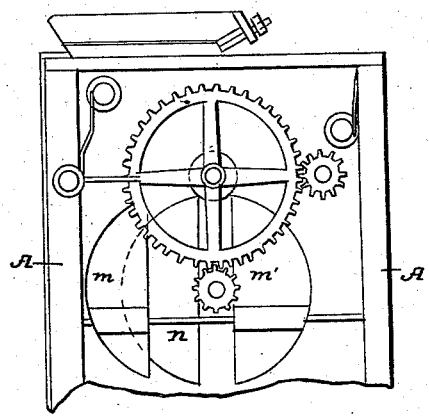
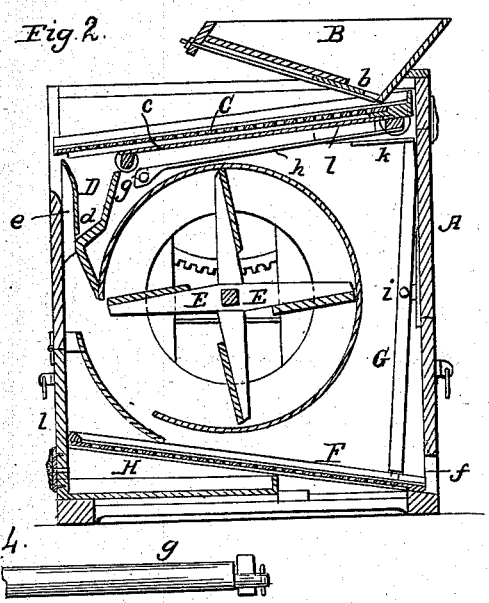

United States Patent Office.

REUBEN GIPSON, OF SHELBY, OHIO.

Letters Patent No. 112,584, dated March 14, 1871.

---

IMPROVEMENT IN FANNING-MILLS.

---

The Schedule referred to in these Letters Patent and making part of the same.

---

*To all whom it may concern:*

Be it known that I, REUBEN GIPSON, of Shelby, in the county of Richland and State of Ohio, have invented a new and valuable Improvement in Fanning-Mills; and I do hereby declare that the following is a full, clear, and exact description of the construction and operation of the same, reference being had to the annexed drawing making a part of this specification and to the letters and figures of reference marked thereon.

Figure 1 of the drawing is a perspective view of my fanning-mill.

Figure 2 is a cross-section of the same.

Figures 3 and 4 are details.

The nature of my invention consists in an improved construction and arrangement of the parts of a fanning-mill, which will be more fully described in the annexed specification.

In the drawing—

A is the frame or casing of the machine, at the upper part of which is arranged the hopper B, provided with a valve, $b$, for regulating the flow of the grain upon the sieves C, under which is arranged the board $c$, by which the grain is conveyed to the hopper D. The straw, pieces of wood, &c., are carried over the sieve C to the outside of the case, while the grain falls through the meshes or holes of the sieve and is carried to the hopper D, falling in a thin stream through the opening D thereof, and is there exposed to the blast of the fan E. The grain is here separated from the chaff and dust, which are blown out through the opening $e$, while the grain falls upon the lower sieves F, by which the small seed and timothy are separated from the good grain, which passes out through the opening $f$ in the side of the casing.

The upper sieve is agitated by the eccentric shaft $g$, journaled in the sides of the frame, and having attached to it a spring, $h$, which gives the sieve a short tittering motion, by which the grain is separated from the straw, coarse chaff, &c.

A rod, G, is pivoted to the side of the case, as shown at $i$. While its lower end is stepped in the sieve F, the upper end is provided with a spring, $k$, and connects to the block $l$ and sieve C, giving a vibratory motion.

A small drawer, H, is arranged under the sieve F to receive the timothy and grass-seeds, and a door, $l$, is provided so as to get at the lower sieves, &c., of the machine.

The fan-case is provided with sliding shutters $m\ m'$, which slide upon a rod, $n$, to regulate the admission of air.

Having thus described my invention,

What I claim, and desire to secure by Letters Patent, is—

1. The sieve C and board $c$, in combination with the hopper D, opening $d$, outlet $e$, and fan E, when said parts are constructed and arranged substantially as shown and for the purpose specified.

2. The arrangement of the sieve C and board $c$, hopper D, opening $d$, fan E, sieve F, and drawer H, all substantially as shown, for the purpose set forth.

3. The combination of the hopper B, valve $b$, sieve C, board $c$ with the hopper D, opening $d$, outlet $e$, fan E, sieve F, drawer H, and opening $f$, when all constructed and arranged as shown and described, for the purpose set forth.

In testimony that I claim the above I have hereunto subscribed my name in the presence of two witnesses.

REUBEN GIPSON.

Witnesses:
S. F. STAMBAUGH,
O. F. STEWART.